(12) United States Patent
Yang

(10) Patent No.: US 7,783,476 B2
(45) Date of Patent: Aug. 24, 2010

(54) WORD EXTRACTION METHOD AND SYSTEM FOR USE IN WORD-BREAKING USING STATISTICAL INFORMATION

(75) Inventor: Jung-Chuan Yang, Taipei (TW)

(73) Assignee: Microsoft Corporation, Redmond, WA (US)

( * ) Notice: Subject to any disclaimer, the term of this patent is extended or adjusted under 35 U.S.C. 154(b) by 1273 days.

(21) Appl. No.: 10/839,144

(22) Filed: May 5, 2004

(65) Prior Publication Data

US 2005/0251384 A1    Nov. 10, 2005

(51) Int. Cl.
G06F 17/21 (2006.01)
G06F 17/27 (2006.01)
G06F 17/20 (2006.01)

(52) U.S. Cl. ............... 704/10; 704/8; 704/9; 715/256; 715/259; 715/264

(58) Field of Classification Search ............ 704/9, 704/10; 715/535, 536
See application file for complete search history.

(56) References Cited

U.S. PATENT DOCUMENTS

| | | | | |
|---|---|---|---|---|
| 5,029,084 A * | 7/1991 | Morohasi et al. | ............... | 704/9 |
| 5,579,224 A * | 11/1996 | Hirakawa et al. | ............... | 704/2 |
| 5,642,518 A * | 6/1997 | Kiyama et al. | ............... | 704/7 |
| 5,867,812 A * | 2/1999 | Sassano | ............... | 704/10 |
| 5,963,893 A * | 10/1999 | Halstead et al. | ............... | 704/9 |
| 6,035,268 A * | 3/2000 | Carus et al. | ............... | 704/9 |
| 6,374,210 B1 * | 4/2002 | Chu | ............... | 704/9 |
| 6,493,713 B1 * | 12/2002 | Kanno | ............... | 707/6 |
| 6,505,151 B1 * | 1/2003 | Chou et al. | ............... | 704/9 |
| 7,065,483 B2 * | 6/2006 | Decary et al. | ............... | 704/7 |
| 7,158,930 B2 * | 1/2007 | Pentheroudakis et al. | ............... | 704/10 |
| 7,174,290 B2 * | 2/2007 | Loofbourrow et al. | ............... | 704/9 |
| 7,228,270 B2 * | 6/2007 | Aso | ............... | 704/10 |
| 7,424,421 B2 * | 9/2008 | Okumura | ............... | 704/8 |
| 2001/0009009 A1 * | 7/2001 | Iizuka | ............... | 707/539 |
| 2003/0208354 A1 * | 11/2003 | Lin et al. | ............... | 704/9 |

OTHER PUBLICATIONS

Kwok, K. L. 1997. Comparing representations in Chinese information retrieval. In Proceedings of the 20th Annual international ACM SIGIR Conference on Research and Development in information Retrieval (Philadelphia, Pennsylvania, United States, Jul. 27-31, 1997). N. J. Belkin, A. D. Narasimhalu, P. Willett, and W. Hersh, Eds. SIGIR '97. ACM Press.*

(Continued)

*Primary Examiner*—David R Hudspeth
*Assistant Examiner*—Paras Shah
(74) *Attorney, Agent, or Firm*—Joseph R. Kelly; Westman, Champlin & Kelly, P.A.

(57) ABSTRACT

A method, computer readable medium and system are provided which collect new words for addition to a lexicon for an agglutinative language. Sentences in the agglutinative language are retrieved from documents, for example from web pages. New word candidate character strings are identified in the retrieved sentences. The identified new word candidate character strings are filtered using a combination of a plurality of statistical criteria to generate a new words list. Words from the new words list are added to the lexicon.

21 Claims, 8 Drawing Sheets

OTHER PUBLICATIONS

Dai, Y., Loh, T. E., and Khoo, C. S. 1999. A new statistical formula for Chinese text segmentation incorporating contextual information. In Proceedings of the 22nd Annual international ACM SIGIR Conference on Research and Development in information Retrieval (Berkeley, California, United States, Aug. 15-19, 1999). SIGIR '99. ACM Press, New York.*

Shan He; Jie Zhu. 2001. Bootstrap method for Chinese new words extraction. Acoustics, Speech, and Signal Processing, 2001. Proceedings. (ICASSP '01). 2001 IEEE International Conference on, vol. 1, Iss., pp. 581-584 vol. 1.*

Ma, W. and Chen, K. 2003. A bottom-up merging algorithm for Chinese unknown word extraction. In Proceedings of the Second SIGHAN Workshop on Chinese Language Processing—vol. 17 (Sapporo, Japan, Jul. 11-12, 2003). Annual Meeting of the ACL. Association for Computational Linguistics, Morristown, NJ, 31-38. DOI=http://dx.doi.org/10.3115/1119250.*

Boxing Chen, Limin Du. 2003. Preparatory Work on Automatic Extraction of Bilingual Multi-Word Units from Parallel Corpora. Computational Linguistics and Chinese Language Processing, vol. 8, No. 2, 2003,pp. 77-92.*

Chien, Lee-feng, 1999,"PAT-tree-based Adaptive Keyphrase Extraction for Intelligent Chinese Information Retrieval," Information Processing and Management, vol. 35, pp. 501-521.*

Lee-Feng Chien and Chen Chun-Liang. 2001. Incremen-tal extraction of domain-specific terms from online textresources. In Recent Advances in Computational Ter-minology, vol. 2 of Natural Language Processing,p. 89.*

Feng, H., Chen, K., Deng, X., and Zheng, W. 2004. Accessor variety criteria for Chinese word extraction. Comput. Linguist. 30, 1 (Mar. 2004), 75-93.*

Shimohata, S., Sugio, T., and Nagata, J. 1997. Retrieving collocations by co-occurrences and word order constraints. In Proceedings of the 35th Annual Meeting of the Association For Computational Linguistics and Eighth Conference of the European Ch (Madrid, Spain, Jul. 7-12, 1997), Morristown, NJ, 476-481.*

Z. Jun, "Lexicon optimization for chinese language modeling," Proc. ISCSLP, Oct. 2000.*

Langer, "Reverse Queries DATR", University of Osnabruck, Germany, pp. 1-7, Nov. 17, 1994.

Davis et al, "Linking as Constraints on Word Classes in a Hierarchical Lexicon", pp. 1-45, Jul. 6, 1999.

Melnik et al., "Building a Distributed Full-Text Index for the Web", ACM Transactions on Information Systems (TOIS), vol. 19, No. 3, pp. 217-241, 2001.

Agichtein et al., "Learning Search Engine Specific Query Transformations for Question Answering", Proceedings of the Tenth International World Wide Web Conference, WWW10, May 1-5, 2001.

Nagarajarao et al., "An Inverted Index Implementation Supporting Efficient Querying and Incremental Indexing", pp. 1-9, May 6, 2002.

Hodge et al., "An Integrated Neural IR System", ESANN'2001 Proceedings, ISBN 2-930307-01-03, pp. 265-270, Apr. 25-27, 2001.

Technical Note TE25, "How to Construct Word-Break Tables", pp. 1-4, Nov. 1, 1987.

Siivola, et al., "Unlimited Vocabulary Speech Recognition Based on Morphs Discovered in an Unsupervised Manner", Eurospeech 2003-Geneva, pp. 2293-2296.

Wen, Li, "Chinese Word Segmentation and Its Effects on Chinese Information Retrieval", http://neoref.ils.unc.edu/2862.pdf, Apr. 2003.

Fillmore et al., C. J., "Transparency and Building Lexical Dependency Graphs", http://framenet.icsi.berkeley.edu/~framenet/papers/cjf_sato_bls02.pdf, at least by Apr. 13, 2004.

* cited by examiner

TABLE 1

| Sentences | New word candidates |
|---|---|
| 早上陳張五六吃 | 早上陳<br>上陳張<br>陳張五<br>張五六<br>五六吃<br>早上陳張<br>上陳張五<br>陳張五六<br>張五六吃<br>早上陳張五<br>上陳張五六<br>陳張五六吃 |
| 昨天陳張五六說 | 昨天陳<br>天陳張<br>陳張五<br>張五六<br>五六說<br>昨天陳張<br>天陳張五<br>陳張五六<br>張五六說<br>昨天陳張五<br>天陳張五六<br>陳張五六說 |
| 要求陳張五六去 | 要求陳<br>求陳張<br>陳張五<br>張五六<br>五六去<br>要求陳張<br>求陳張五<br>陳張五六<br>張五六去<br>要求陳張五<br>求陳張五六<br>陳張五六去 |

FIG. 6

TABLE 2

| New word candidates | Frequency |
|---|---|
| 早上陳 | 1 |
| 上陳張 | 1 |
| 陳張五 | 3 |
| 張五六 | 3 |
| 五六吃 | 1 |
| 早上陳張 | 1 |
| 上陳張五 | 1 |
| 陳張五六 | 3 |
| 張五六吃 | 1 |
| 早上陳張五 | 1 |
| 上陳張五六 | 1 |
| 陳張五六吃 | 1 |
| 昨天陳 | 1 |
| 天陳張 | 1 |
| 五六說 | 1 |
| 昨天陳張 | 1 |
| 天陳張五 | 1 |
| 張五六說 | 1 |
| 昨天陳張五 | 1 |
| 天陳張五六 | 1 |
| 陳張五六說 | 1 |
| 要求陳 | 1 |
| 求陳張 | 1 |
| 五六去 | 1 |
| 要求陳張 | 1 |
| 求陳張五 | 1 |
| 張五六去 | 1 |
| 要求陳張五 | 1 |
| 求陳張五六 | 1 |
| 陳張五六去 | 1 |

FIG. 7

TABLE 3

|  | Left-hand side variance | Right-hang side variance |
|---|---|---|
| 陳張五 | 3/3 | 1/3 |
| 張五六 | 1/3 | 3/3 |
| 陳張五六 | 3/3 | 3/3 |

FIG. 8

WORD EXTRACTION METHOD AND SYSTEM FOR USE IN WORD-BREAKING USING STATISTICAL INFORMATION

BACKGROUND OF THE INVENTION

The present invention is related to word-breakers. More particularly, the present invention is related to new word extraction or collection methods for use in word-breaking.

Word identification or word-breaking is an important component of natural language processing applications that process textual inputs. In particular, word-breaking is important in most search engines. The search engines perform word-breaking on input strings for several purposes. For example, word-breaking is applied to input strings to determine component words of a compound word.

Word identification or word-breaking is an especially important task for search engines while processing languages, such as Chinese, which have no blank spaces between words. Such languages, which are sometimes referred to as agglutinative languages, include Chinese, Japanese and Korean, for example. An agglutinative language is a language in which words are made up of a linear sequence of distinct morphemes, and each component of meaning is represented by its own morpheme. Other examples of agglutinative languages include Sumerian, Hourrite, Ourartou, Basque and Turkish. Generally, in agglutinative languages, words can be compounded without spaces separating the component words.

In languages such as Chinese, word-breaking is typically implemented by searching for nouns. However, these nouns may be new words which do not exist in the original dictionaries or lexicons used by the word-breaker. When this occurs, the word-breaker cannot properly identify words from web pages and user queries. This in turn causes a lower precision rate in the search results.

Collecting new words for a custom lexicon used by the word-breaker is an endless task. Existing techniques for collecting the new words for the custom lexicon are time consuming and burdensome. Typically, new words are manually collected by search engine developers for addition to the custom lexicon used by that search engine. New words are also manually collected by developers for inclusion in the next product generation's system dictionary. The time consuming and labor intensive nature of these new word collection techniques leaves much to be desired.

SUMMARY OF THE INVENTION

A method, computer readable medium and system are provided which collect new words for addition to a lexicon for an agglutinative language. Sentences in the agglutinative language are retrieved from documents, for example from web pages. New word candidate character strings are identified in the retrieved sentences. The identified new word candidate character strings are filtered using a combination of a plurality of statistical criteria to generate a new words list. Words from the new words list are added to the lexicon.

When retrieving sentences from web pages, the web pages can be retrieved using a crawler component, and a sentence breaking component can be used to obtain the sentences. In some embodiments, the step of identifying new word candidate character strings in the retrieved sentences includes identifying new word candidate character strings having a predetermined range of number of characters. In one particular embodiment, new word candidate characters strings have between three characters and five characters.

Filtering the identified new word candidate character strings using the combination of the plurality of statistical criteria to generate the new words list includes, in some embodiments, filtering using both a frequency criteria and a variance criteria. In other embodiments, filtering is also based upon a character association criteria.

While the present invention applies generally to agglutinative languages in which there are no blank spaces between words, in particular embodiments, the present invention applies to the Chinese language.

Other features and benefits that characterize embodiments of the present invention will be apparent upon reading the following detailed description and review of the associated drawings.

BRIEF DESCRIPTION OF THE DRAWINGS

FIG. 6 is a table illustrating new word candidates extracted from retrieved sentences.

FIG. 7 is a table illustrating frequencies of new word candidates.

FIG. 8 is a table illustrating variances of new word candidates.

DETAILED DESCRIPTION OF ILLUSTRATIVE EMBODIMENTS

Figure 1:
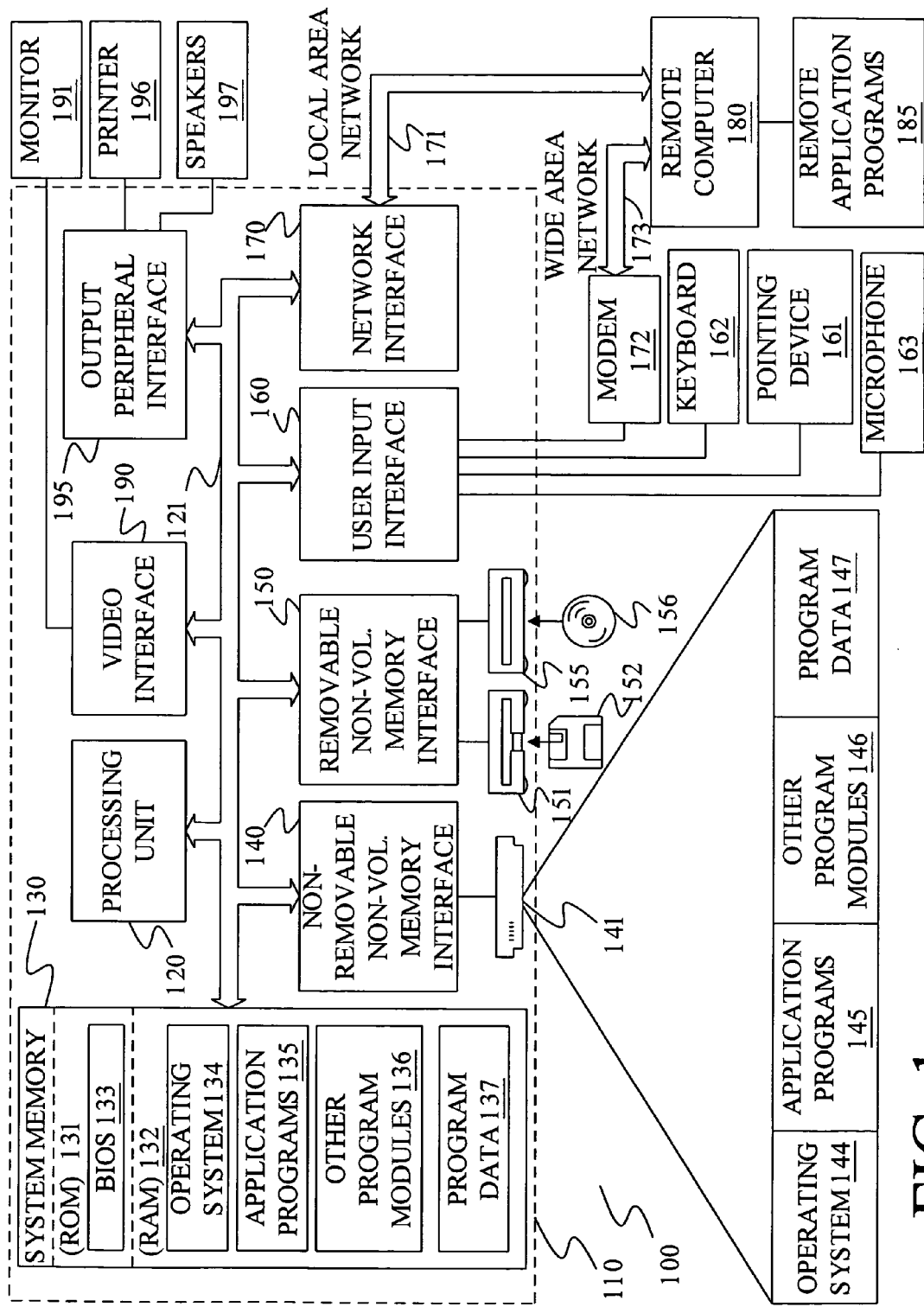
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
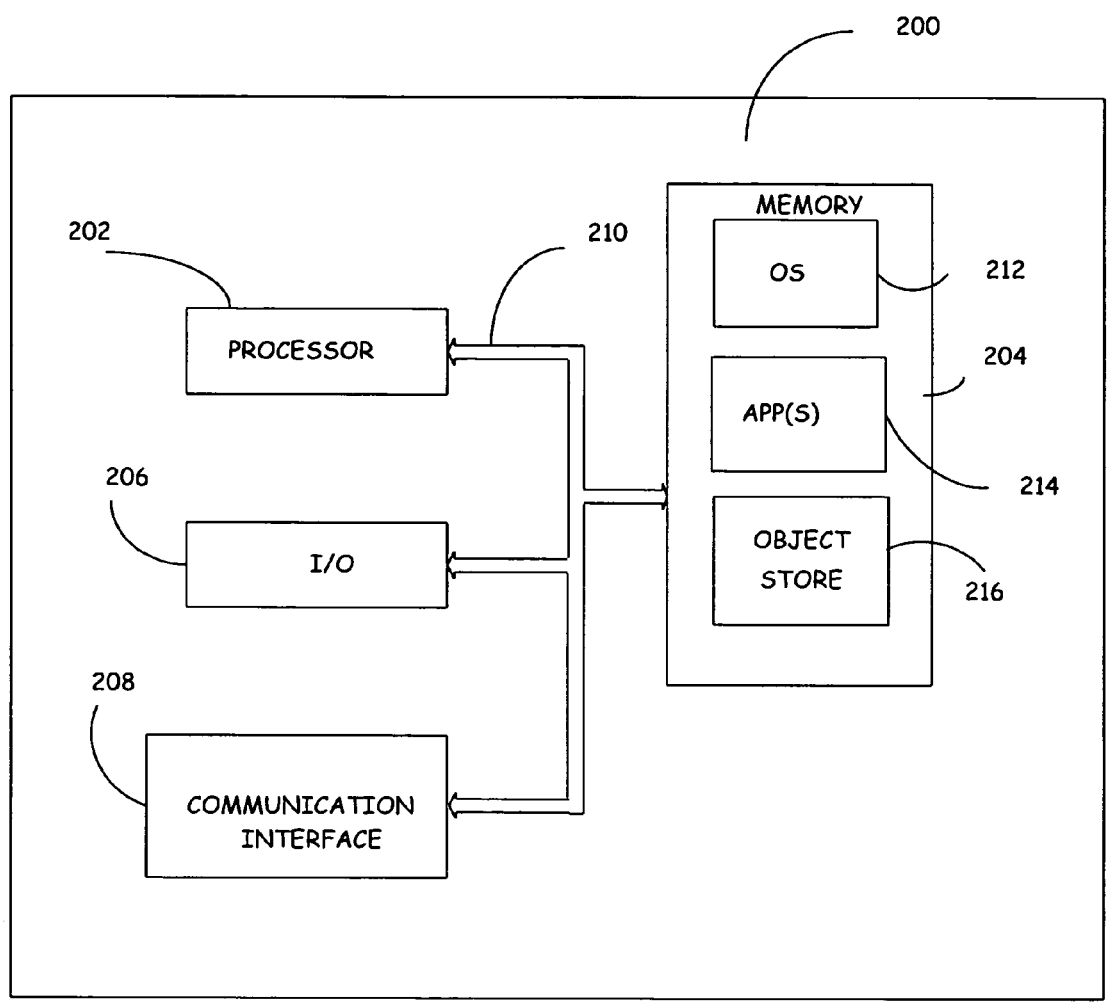
FIG. 2 is a block diagram of a general mobile computing environment in which the present invention can be implemented.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

The present invention includes improved methods for collecting new words to be added to a lexicon used by a word-breaker. Either or both of the collection method and the word-breaker can be implemented in computing environments such as the one illustrated in FIG. 1, or in other types of computing environments. In contrast to conventional methods that typically involve a high degree of manual effort to collect new words for inclusion in a custom lexicon or system dictionary, the methods and systems of the present invention obtain new words automatically, or semi-automatically. The new word collection methods of the present invention are particularly useful for agglutinative languages in which words are compounded or otherwise appear without the use of spaces or hyphens between words.

Figure 3:
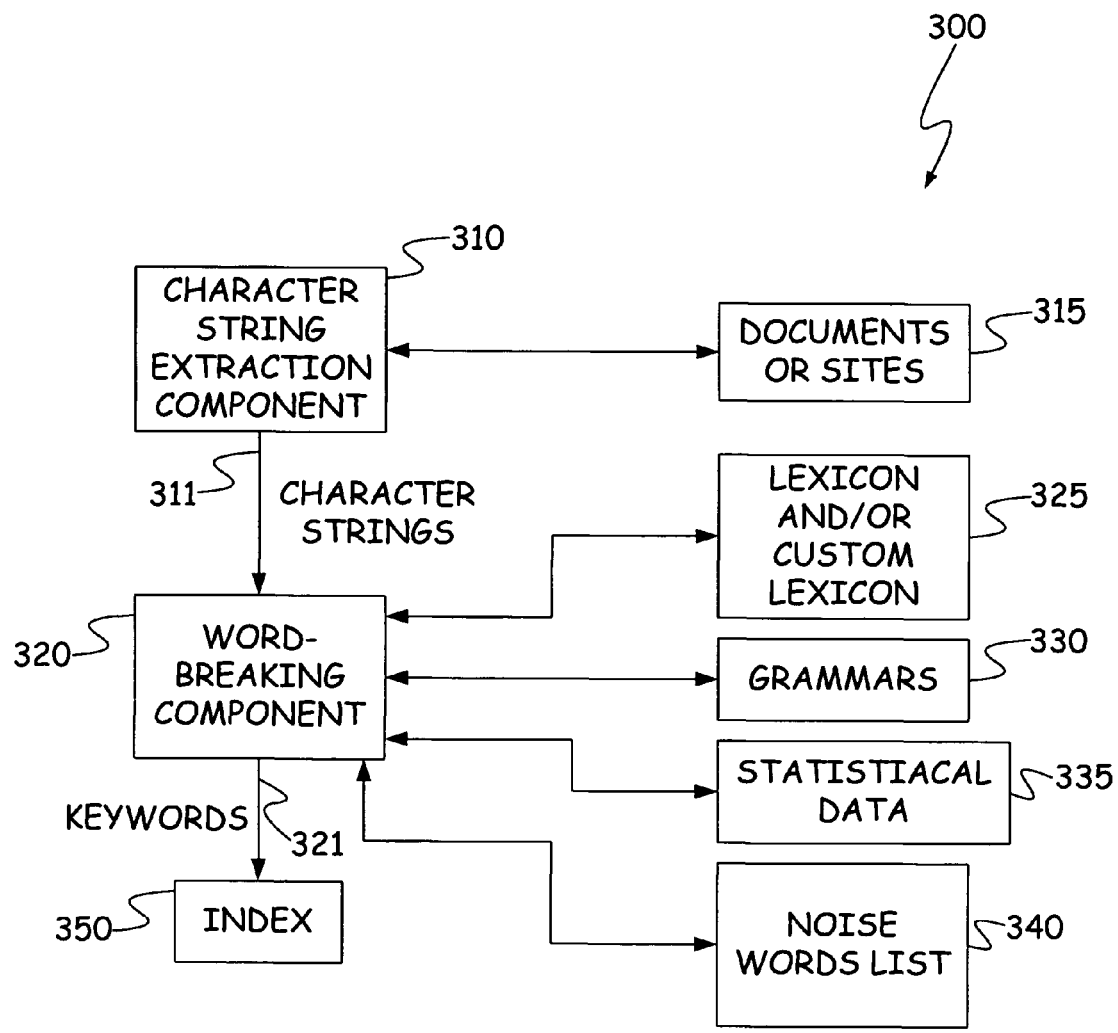
FIG. 3 is a block diagram illustrating one embodiment of a search engine indexing system with which the present invention is useful.
Figure 4:
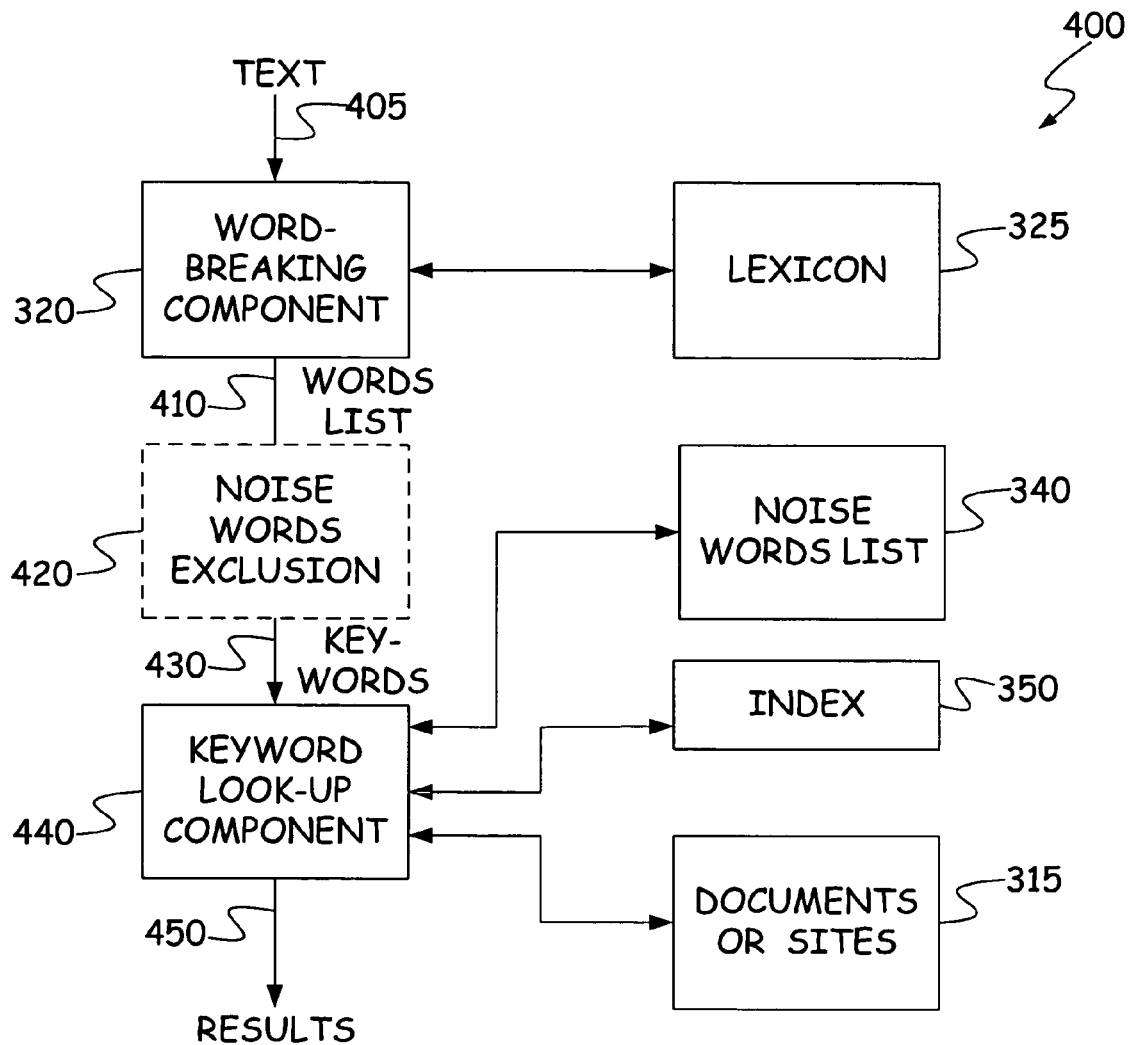
FIG. 4 is a block diagram illustrating one embodiment of a search engine system with which the present invention is useful.

FIGS. 3 and 4 are block diagrams illustrating a search engine indexing system 300 and a search engine system 400, both of which utilize a word-breaking module or component. The word-breaking module in turn utilizes a dictionary or lexicon. The present invention includes methods and apparatus for adding new words to the lexicon. A further discussion of these methods follows a description of the systems shown in FIGS. 3 and 4.

As noted, FIG. 3 is a block diagram of a search engine indexing system 300 illustrating one use of word-breaking during a process of indexing documents or websites for later use with a search engine. System 300 includes a character string extraction module or component 310. At an index time, component 310 extracts character strings 311 from documents or websites (collectively referred to as "documents") shown at 315.

The system 300 also includes a word-breaking module or component 320 that analyzes the character strings 311 to generate keywords 321. The word-breaking component 320 can function as conventional word-breaking modules or components function. In the process of generating keywords 321 from character strings 311, word-breaking component 320 utilizes a lexicon 325. Lexicon 325 can be a conventional full lexicon used by a variety of applications, a custom lexicon specific to a particular application, or a combination of the two. In a conventional manner, word-breaking component 320 can also use appropriate grammars 330 and statistical data 335 for the particular agglutinative language of the character strings.

Since some search engines exclude certain noise words, word-breaking component 320 can also access a noise words database or list 340 and subtract or exclude the noise words from the group of resultant words that will eventually be provided as keywords 321. This function can also be implemented in a separate noise words exclusion step by a separate noise words exclusion module or component if desired. The noise words in noise word list 340 can be customizable or specific to particular search engines since not all search engines are likely to exclude the same noise words. Example noise words might include functional words such as those corresponding to "a" and "the" in the English language. Many other examples of other types of noise words are also possible, and would depend upon the particular agglutinative language.

The resultant keywords 321 provided by word-breaking component 320 are added to an index 350. Index 350 correlates the keywords to the documents 315 from which the original character strings were extracted. These keywords are then used to retrieve appropriate documents in response to a search engine query including the keywords.

FIG. 4 is a block diagram of a search engine system 400 illustrating one use of word-breaking during a search for documents or websites in response to a natural language user query. System 400 includes word-breaking component 320 that receives a user query in the form a text input 405. The text input 405 is, in the case of agglutinative languages for example, typically in the form of a string of text without spaces between individual words. The word-breaking component is illustrated as being the same word-breaking module or component used in system 300 described in FIG. 3. However, this need not necessarily be the case, and differences between the word-breaking components used in the various systems can exist.

Word-breaking component 320 uses lexicon 325 to perform the word-breaking functions in a known manner. As discussed previously, the word-breaking component can also use grammars, statistical data and other resources to perform the word-breaking functions as is required or most beneficial for the particular language being analyzed. The output of word-breaking component 320 is a words list 410 derived from the text input 405.

Similar to indexing system 300 discussed above, search engine system 400 can exclude noise words. Again, the noise words can include functional words such as equivalents of "a" and "the", or other words that are not rich in content and that do not carry significant meaning. The noise words can be specific to particular languages. Noise word exclusion is optional, and can be implemented in a separate noise word exclusion module or component 420, or it can be implemented within word-breaking component 320. After noise word exclusion, the result is a list or group of keywords 430.

System 400 also includes a keyword look-up module or component 440 that compares the keywords 430 to the keywords stored in index 350. For matches of keywords 430 to keywords in index 350, the corresponding documents or sites 315 (or a list of the corresponding documents or sites) are retrieved. Keyword look-up component 440 will typically rank the retrieved documents or sites such that the results 450 are most probably the intended results for the query. For example, component 440 can rank the results based upon frequency of the keywords within the documents or sites, based upon the percentage of the keywords that are actually found in individual documents or sites, or by other ranking criteria.

Figure 5:
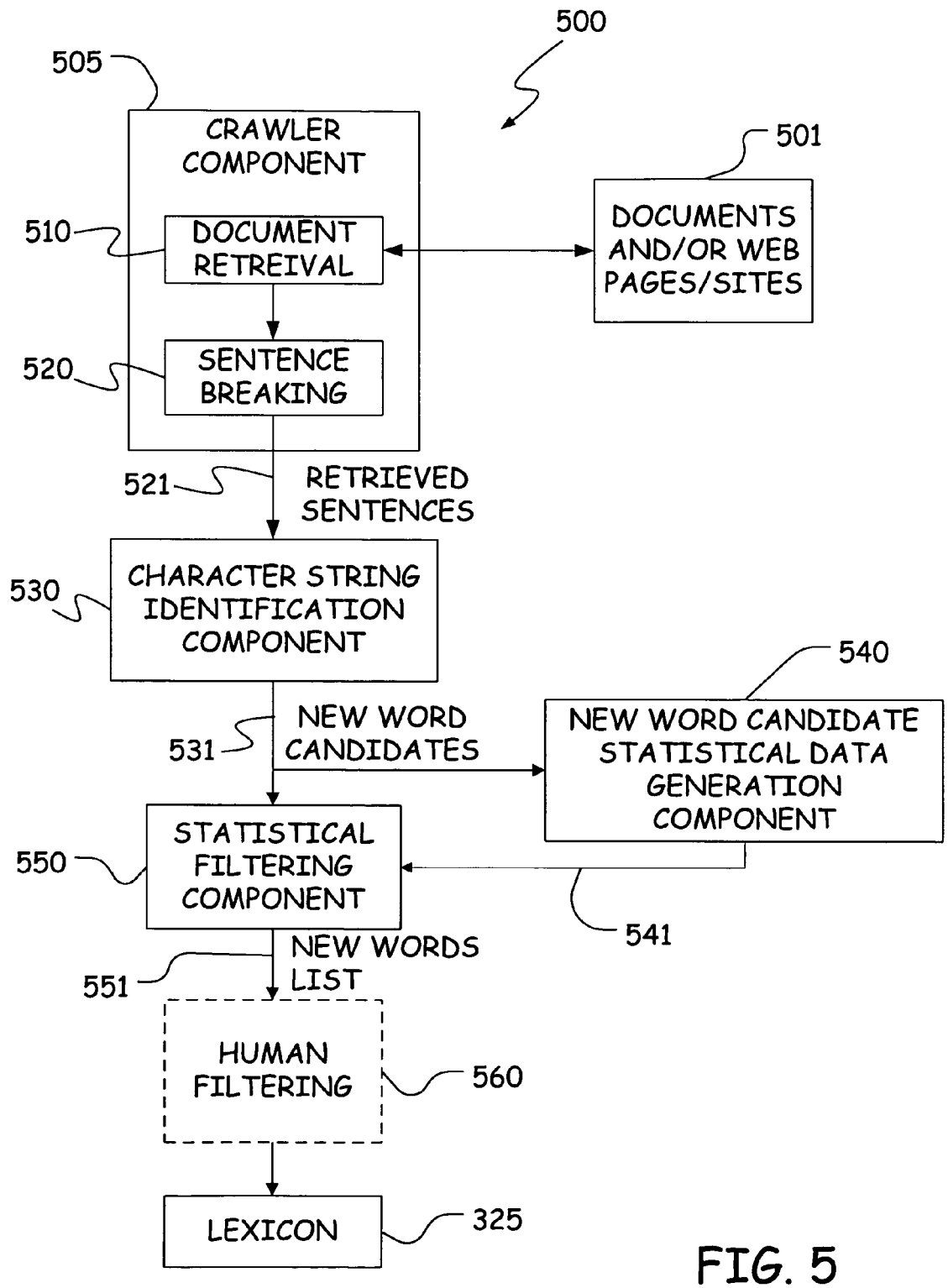
FIG. 5 is a block diagram illustrating one embodiment of a new word collection system and method of the present invention.

Referring now to FIG. 5, shown is a new word collection system 500 in accordance with embodiments of the present invention. The various modules or components illustrated in FIG. 5 are similarly representative of methods of the present invention. System 500 and its corresponding methods are described together in order to better illustrate the invention.

A first step in the new word collection method of the present invention is to extract or retrieve sentences, in a particular agglutinative language, from documents and/or web pages/sites (sometimes collectively referred to herein as "documents") 501. This is illustrated in FIG. 5 as crawler component or functions 505. In an exemplary embodiment, the crawler component retrieves sentences from web pages over the world wide web or internet using web crawling techniques typically employed by internet search engine providers. Retrieval of these pages and sentences can also be over computer networks other than the internet.

The step of extracting or retrieving sentences in an agglutinative language, such as Chinese, is shown in FIG. 5 as including two sub-steps. First, a document retrieval module or component 510 of the crawler retrieves the documents (i.e., web pages/sites or other documents), and then a sentence breaking component 520 identifies sentences on the documents. The output of crawler component 505 and the sub-steps described is a list of retrieved sentences 521.

Next, as illustrated at 530 in FIG. 5, a character string identification component extracts new word candidates 531 from the retrieved sentences. The character string identification component 530 can access dictionary or lexicon 325 to eliminate from the new word candidates 531 any words which are already in the lexicon. Generally, all character strings or streams can be new word candidates. However, in an exemplary embodiment, only character strings having a predetermined number of characters, or a predetermined range of numbers of characters, are considered new word candidates. For example, in one embodiment only character strings having between three and five characters are considered new word candidates.

As a specific example, assume that crawler component 505 retrieves three Traditional Chinese sentences from pages 501:

早上陳張五六吃

昨天陳張五六

要求陳張五六去

Also assume that the yet to be identified character string "陳張五六" represents a new word which does not exist in lexicon 325. Note that this example is greatly simplified, using a small number of retrieved sentences relative to the number of sentences that would typically be retrieved by crawler component 505 during actual operation.

Considering only new word candidates which have three, four or five characters, the new word candidates 531 from these three sentences are shown in Table 1 of FIG. 6. The new word candidates include all strings of three, four or five consecutive characters found within the respective sentences.

Referring back to FIG. 5, the method of the present invention includes filtering the new word candidates 531 using a statistical filtering component 550 based upon multiple statistical criteria to generate or obtain a new words list 551. The step of filtering the new word candidates based upon multiple statistical criteria can further include the step shown at 540 of calculating or generating new word candidate statistical data. In an exemplary embodiment, statistical data generation component and step 540 generates the following statistic information for new word candidates 531:

(1) Frequency of occurrence of the new word candidate character string in the retrieved sentences 521;

(2) Variance of left-hand side and right-hand side characters of the new word candidate character string in the retrieved sentences 521; and (3) Character association of the new word candidate character string.

Thresholds are defined for each of the multiple types of statistic information, and any new word candidates 531 which satisfy the criteria established for each of the different statistical tests (or a predetermined pair of the statistical tests in alternative embodiments) are placed in the new word list 551. This threshold testing based upon multiple statistical criteria is implemented by filtering component 550. Further discussion of the above-described statistical criteria, and therefore of the operation of statistical data generation component 540 and statistical filtering component 550, are provided now with reference to FIGS. 7 and 8.

Referring now to Table 2 shown in FIG. 7, shown is the frequency of occurrence of each of the new word candidate character strings identified in Table 1. The frequency of occurrence is the number of times that the particular new word candidate appeared in the retrieved sentences 521. In this example, only three sentences have been retrieved to simplify the illustration. Therefore, the frequencies of occurrence shown in Table 2 corresponds to the number of times that particular new word candidates appeared in the three sentences.

Filtering component 550 is configured to eliminate from contention any new word candidate character strings which do not appear at least some threshold number of times in the retrieved sentences. For purposes of illustration using this example, if the threshold frequency were set to 3, then only the candidates "陳張五", "張五六" and "陳張五六" pass this threshold and are still considered for addition to the new words list.

Next, consider the variance statistical information described above. While in some embodiments the variance statistical information is calculated for each new word candidate identified, in other embodiments the variance information is only calculated for any new word candidates which have passed other criteria, such as the frequency criteria. In the current example, since only the terms "陳張五", "張五六"and "陳張五六"passed the frequency threshold criteria implemented by filtering component 550, statistical data generation component 540 only calculates the variance of left-hand side and right-hand side characters for "陳張五", "張五六"and "陳張五六".

Left-hand side variance of a new word candidate is defined as the number of different characters which appear at the left-hand side of the new word candidate divided by the frequency of the new word candidate. More specifically, this is the number of different characters which are immediately adjacent to the first or left-hand side character of the new word candidate in the retrieved sentences. Right-hand side variance of a new word candidate is similarly defined as the number of different characters which appear immediately adjacent at the right-hand side of the new word candidate divided by the frequency of the new word candidate.

Using the three sentences discussed above for the current example, the left-hand side characters of "陳張五"are "上", "天"and "求", and the right-hand side characters are "六". Therefore the left-hand side variance is equal to 1 (i.e., 3/3) since there are 3 different characters "上", "天"and "求"adjacent to the left-hand side of "陳張五"in the sentences, and since the frequency of "陳張五"is 3 as shown in Table 2. The right-hand side variance of "陳張五"is equal to 1/3 since there is only one character "六"found to the right-hand side of "陳張五", and since the frequency of "陳張五"is 3.

Table 3 shown in FIG. 8 is a variance table illustrating the left-hand side variance and the right-hand side variance for each of the new word candidates "陳張五", "張五六"and "陳張五六"which passed the minimum frequency requirement. In some embodiments, filtering component 550 shown in FIG. 5 is configured to eliminate from contention any new word candidate character strings which do not have left-hand side and right-hand side variances above some threshold(s). The threshold for the left-hand side variance can be the same as the threshold for the right-hand side variance in embodiments of the invention, or the thresholds can be set to different values as desired. If for example the left-hand side variance threshold and the right-hand side variance threshold in this case were both set to 0.8, the only remaining new word candidate to meet these thresholds is "陳張五六".

In some embodiments, any new word candidates which pass both the frequency and variance threshold requirements are placed in new word list 551 without further statistical filtering. However, as described above, in other embodiments any new word candidate must also pass a character association (CA) requirement before being placed in the new word list 551. In the context of the present invention, character association is defined as the frequency of two characters appearing adjacent one another in the retrieved sentences, divided by the multiplication product of the frequency of the first character and the frequency of the second character in the retrieved sentences. In other words:

$$CA=(\text{frequency of two adjacent characters})/(\text{frequency of first character}*\text{frequency of second character})$$

Since after the above two criteria (frequency and variance) only "陳張五六"remains as a new word candidate in this example, character association is calculated only for "陳張五六". Three strings of two characters exist in "陳張五六": "陳張", "張五", and "五六". The individual character associations for these three strings are calculated as shown:

陳張$\to CA=3/(3*3)=3/9=0.333$

張五$\to CA=3/(3*3)=3/9=0.333$

五六$\to CA=3/(3*3)=3/9=0.333$

Therefore, the average character association of "陳張五六"is $(0.333+0.333+0.333)/3=0.333$. If an average character association threshold is set to 0.3, for example, then "陳張五六"meets the character association criteria. In some embodiments, filtering component 550 shown in FIG. 5 is configured to eliminate from contention any new word candidate which does not meet the character association criteria threshold. The result is a new words list 551 which contains only character strings which passed each statistical filtering criteria. In the present example, only "陳張五六"meets each of the statistical criteria to be added to the new words list 551.

In some embodiments, new words list 551 is human filtered (i.e., reviewed by one or more persons to verify and/or exclude new words) before adding the new words list 551 to lexicon or dictionary 325. This is illustrated at 560 in FIG. 5. However, in other embodiments, the new words list is added to lexicon 325 without any human filtering. The determination whether to utilize human filtering will typically be made based upon a workload/effect tradeoff analysis. With new words added to lexicon 325, the lexicon is used by the word-breaker during query and index processing functions as described above.

To summarize the use of word-breaking component 320 and lexicon 325, at index time, a system such as the one shown in FIG. 3 extracts character strings from documents. The extracted character strings are analyzed by the word-breaker 320. In this process, the word-breaker uses the lexicon and/or a custom lexicon, grammars, statistic, etc, as described above with reference to FIG. 3. The resultant keywords are stored in the index.

At query time, a word-breaking component of a system such as the one shown in FIG. 4 is used to obtain a words list from a text input string of a user query. The resulting words list, or keywords from the resulting words list, are used as look-up parameters to search the index. The system then returns the most probable result files (or sites).

Periodically, an off-line process is implemented in which the new word extraction method shown in FIG. 5 is run to obtain new words. These new words are then added to the word-breaker dictionary or lexicon, and the documents or web pages are re-indexed using the updated word-breaker lexicon.

The methods and systems of the present invention provide improved linguistic analysis results. In the search scenario, better search result are achievable using the lexicon. Also, the present invention reduces the man-power requirements needed to maintain the word-breaker lexicon or dictionary.

Although the present invention has been described with reference to particular embodiments, workers skilled in the art will recognize that changes may be made in form and detail without departing from the spirit and scope of the invention.

What is claimed is:

1. A method of collecting new words for addition to a lexicon for an agglutinative language, the method comprising:

using a processor to retrieve sentences in the agglutinative language from documents;

using the processor to identify new word candidate character strings in the retrieved sentences having a predetermined range of number characters;
using the processor to filter the identified new word candidate character strings using a combination of a plurality of statistical criteria to generate a new words list, the plurality of statistical criteria comprising:
  a frequency criteria comprising a frequency of occurrence of a new word candidate character string in the retrieved sentences;
  a variance criteria comprising a left-hand side variance criteria comprising a number of different single characters which appear adjacent a left-hand side of the new word candidate character string divided by the frequency of occurrence of the new word candidate character string in the retrieved sentences;
  a character association criteria comprising a frequency of occurrence of two characters appearing adjacent one another in the retrieved sentences, divided by the multiplication product of a frequency of occurrence of a first of the two characters in the retrieved sentences and a frequency of occurrence of a second of the two characters in the retrieved sentences;
using the processor to filter the identified new word candidate character strings further comprising:
  calculating the frequency criteria for all of the new word candidate character strings;
  calculating the variance criteria for only new word candidate character strings that have a frequency criteria greater than a first threshold;
  calculating the character association criteria for only new word candidate character strings that have a variance criteria greater than a second threshold;
  adding a new word candidate character string to the new words list when the character association criteria is greater than a third threshold; and
using the processor to add words from the new words list to the lexicon.

2. The method of claim 1, wherein the step of using the processor to retrieve sentences in the agglutinative language from documents comprises retrieving sentences from web pages.

3. The method of claim 2, wherein the step of retrieving sentences from web pages comprises:
  retrieving the web pages using a crawler component; and
  sentence breaking the retrieved web pages to obtain the sentences.

4. The method of claim 3, wherein identifying new word candidate character strings having the predetermined range of number of characters further comprises identifying new word candidate character strings having between three characters and five characters.

5. The method of claim 3, wherein using the processor to identify new word candidate character strings in the retrieved sentences further comprises identifying new word candidate character strings which are not already in the lexicon.

6. The method of claim 1, wherein the variance criteria further comprises a right-hand side variance criteria comprises a number of different characters which appear adjacent to a right-hand side of the new word candidate character string divided by the frequency of the new word candidate character string in the retrieved sentences.

7. The method of claim 6, further comprising:
  calculating the variance criteria comprises calculating the left-hand side variance criteria and the right-hand side variance criteria;
  the second threshold comprises a left-hand side variance threshold and a right-hand side variance threshold; and
  calculating the character association criteria for only new word candidate character strings that have a left-hand side variance criteria greater than the left-hand side variance threshold and also have a right-hand side variance criteria greater than the right-hand side variance threshold.

8. The method of claim 7, wherein the left-hand side variance threshold and a right-hand side variance threshold are both a same value.

9. The method of claim 7, wherein the left-hand side variance threshold and a right-hand side variance threshold are different values.

10. A new word collection system for collecting new words in an agglutinative language for addition to a lexicon, the system comprising:
  a crawler component retrieving sentences in an agglutinative language from documents;
  a character string identification component identifying new word candidate character strings in the retrieved sentences the new word candidate character strings having a predetermined range of number of characters; and
  a statistical filtering component filtering the identified new word candidate character strings using a combination of a plurality of statistical criteria to generate a new words list, the plurality of statistical criteria comprising a frequency criteria, a variance criteria, and a character association criteria, the filtering comprising:
    calculating the frequency criteria for all of the new word candidate character strings;
    calculating the variance criteria for only new word candidate character strings that have a frequency criteria greater than a first threshold;
    calculating the character association criteria for only new word candidate character strings that have a variance criteria greater than a second threshold; and
    adding a new word candidate character string to the new words list when the character association criteria is greater than a third threshold.

11. The method of claim 1, wherein the character association criteria further comprises an average of character associations of various pairs of characters from the new word candidate character string.

12. The method of claim 1, and further comprising using the processor to re-index a plurality of documents or sites using an updated lexicon having the new words added.

13. The method of claim 12, and further comprising performing search engine query analysis using the updated lexicon.

14. The method of claim 1, wherein the agglutinative language is Chinese.

15. The new word collection system of claim 10, wherein the frequency criteria comprises a frequency of occurrence of a new word candidate character string in the retrieved sentences.

16. The new word collection system of claim 10, wherein the character string identification component is configured to identify new word candidate character strings having between three characters and five characters.

17. The new word collection system of claim 10, wherein the agglutinative language is Chinese.

18. The new word collection system of claim 10, wherein the variance criteria comprises a left-hand side variance criteria comprising a number of different single characters which appear adjacent a left-hand side of the new word candidate character string divided by the frequency of occurrence of the new word candidate character string in the retrieved sentences.

19. The new word collection system of claim 18, wherein the character association criteria comprises a frequency of occurrence of two characters appearing adjacent one another in the retrieved sentences divided by the multiplication product of a frequency of occurrence of a first of the two characters in the retrieved sentences and a frequency of occurrence of a second of the two characters in the retrieved sentences.

20. The new word collection system of claim 19, wherein the variance criteria further comprises a right-hand side variance criteria comprising a number of different characters which appear adjacent to a right-hand side of the new word candidate character string divided by the frequency of the new word candidate character string in the retrieved sentences.

21. The new word collection system of claim 20, further comprising:

calculating the variance criteria comprises calculating the left-hand side variance criteria and the right-hand side variance criteria;

the second threshold comprises a left-hand side variance threshold and a right-hand side variance threshold; and calculating the character association criteria for only new word candidate character strings that have a left-hand side variance criteria greater than the left-hand side variance threshold and also have a right-hand side variance criteria greater than the right-hand side variance threshold.

* * * * *